United States Patent Office 3,192,209
Patented June 29, 1965

3,192,209
AMINO ACID ESTERS OF 4-HYDROXYALKYL-2-PYRROLIDINONES AND 4-HYDROXYALKYL-2-THIONPYRROLIDINONES
Carl D. Lunsford, Richmond, and Albert D. Cale, Jr., Bon Air, Va., assignors to A. H. Robins Company, Inc., Richmond, Va., a corporation of Virginia
No Drawing. Filed Mar. 11, 1963, Ser. No. 264,050
13 Claims. (Cl. 260—247.1)

The present invention relates to certain heterocyclic esters which may be referred to as aminoacid esters of 4-hydroxyalkyl-2-pyrrolidinones and 4-hydroxyalkyl-2-thionpyrrolidinones, and is more particularly concerned with amino-lower-aliphatic acid esters of 4-hydroxyalkyl-3,3-disubstituted-1-substituted-2-pyrrolidinones and 4-hydroxyalkyl - 3,3 - disubstituted-1-substituted-2-thionpyrrolidinones, compositions thereof, and a method of making and using the same. The compounds may also be referred to as 4 - (aminoalkanoyloxyalkyl)-3,3-disubstituted-1-substituted-2-pyrrolidinones and 2-thionpyrrolidinones.

The invention is especially concerned with such heterocyclic esters having the formula:

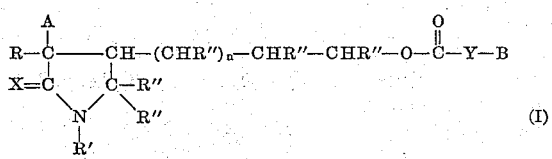

wherein

A is monocarbocyclic aryl,
X is sulfur or oxygen,
R is monocarbocyclic aryl, monocarbocyclic aralkyl, lower-alkyl, cycloalkyl pyridyl, thienyl, or thenyl,
R' is lower-alkyl, lower-alkenyl, cycloalkyl, cycloalkenyl or monocarbocyclic aralkyl,
R'' is hydrogen or methy, preferably a maximum of two R'' being other than hydrogen,
$n$ is zero, or one,
Y is a lower-alkylene radical of straight or branched structure containing up to and including six carbon atoms, wherein:

B is an amino radical, and acid-addition salts thereof.

The compounds of the present invention having the foregoing Formula I are generally characterized by important pharmacological activity, indicative of their use in counteracting certain physiological abnormalities in an animal body. The compounds are analeptics, hypotensives, or both. Certain compounds of the series are extremely potent and long-lasting analeptics, stimulating respiration and antagonizing central nervous system depression and exhibiting a particularly durable antagonism against barbiturate-induced depression or poisoning at dose levels considerably below that at which untoward side effects occur. While the degree and relative degree of their activities vary, all compounds tested exhibited analeptic activity although, as stated, because of the relative degree of analeptic versus hypotensive activity, some are preferred as hypotensives. The salts have special utility in that they are water-soluble and have an extended duration of activity.

The high order of activity of the active agents of the present invention, as evidenced by tests in lower animals, is indicative of utility based on their valuable activity in human beings as well as in lower animals. Clinical evaluation in human beings has not been completed, however. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

It is accordingly an object of the present invention to provide new and useful amino-lower-aliphatic acid esters of 4-hydroxyalkyl-2-pyrrolidinones and -2-thionpyrrolidinones, compositions thereof, and a method of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

By "monocarbocyclic aryl" radical is meant an aryl radical of the benzene series, having six ring carbon atoms, and this term includes the unsubstituted phenyl radical and phenyl radicals substituted by any radical or radicals which are not reactive or otherwise interfering under the conditions of reaction, such as nitro, lower-alkoxy, lower-alkylmercapto, lower-alkyl, di-lower-alkyl-amino, trifluoromethyl, halo, and the like. The substituted-phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl, lower-alkoxy, lower-alkylmercapto, and di-lower-alkyl-amino ring subsituents each have from one to four carbon atoms which can be arranged as straight or branched chains. A total of nine carbon atoms in all ring substituents is the preferred maximum.

In the foregoing definition of R, certain cyclic radicals are referred to. When pyridyl is referred to, the 3- or 4-pyridyl radicals are included. When thienyl or thenyl radicals are referred to, these may be, for example, the 2- or 3-thienyl or 2- or 3-thenyl radicals.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. The term "lower-alkenyl" includes straight and branched chain radicals of two up to eight carbon atoms inclusive and is exemplified by such groups as vinyl, allyl, methallyl, 4-pentenyl, 3-hexenyl, and 3-methyl-3-heptenyl. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. The term "cycloalkenyl" as used herein includes cyclic alkenyl radicals containing up to nine carbon atoms inclusive and encompasses such usual radicals as 1- and 2-cyclohexenyl and 1- and 2-cyclopentenyl. Included in the term "aralkyl" are lower-alkyl substituted monocarbocylic aryl groups such as benzyl, phenethyl, methylbenzyl, phenpropyl, and the like. As stated, the radicals R and R' in the foregoing Formula I are inclusive of such groups as lower-alkyl, cycloalkyl, cycloalkenyl, and aralkyl, and R' includes lower-alkenyl, which groups are all preferably although not necessarily radicals of a solely hydrocarbon nature.

When halogen is referred to herein, preferably but not necessarily a halogen of atomic weight in excess of nineteen but not greater than eighty is employed. Of the halogens, chlorine is preferred.

Among the suitable amino radicals included within the symbol B are secondary and tertiary amino radicals, such as lower-alkyl-amino; di-lower-alkyl-amino; lower-alkenyl-amino; di-lower-alkenyl-amino; phenylamino; (hydroxy-lower-alkyl)-amino; di-(hydroxy-lower-alkyl)-amino; lower-alkyl-(hydroxy-lower-alkyl)-amino; basic saturated monocyclic heterocyclic radicals of less than twelve carbon atoms, as exemplified by piperidino; lower-alkyl-piperidino, e.g., 2-, 3-, or 4-lower-alkyl-piperidino; di-lower-alkyl-piperidino, e.g., 2,4-, 2,6-, or 3,5-di-lower-alkyl-piperidino; lower-alkoxy-piperidino; pyrrolidino; lower-alkyl-pyrrolidino; di-lower-alkyl-pyrrolidino; lower-alkoxy-pyrrolidino; morpholino, lower-alkyl-morpholino; di-lower-alkyl-morpholino; lower-alkoxy-morpholino; thiomorpholino; lower-alkyl-thiomorpholino; di-lower-alkyl-thiomorpholino; lower-alkoxy-thiomorpholino; piperazino, lower-alkyl-piperazino (e.g., C- or N⁴-methylpiperazino); di-C-(lower-alkyl)-piperazino; N⁴-(lower-alkyl)-C-(lower-alkyl)-piperazino; N-(hydroxy-lower-alkyl)-piperazino; N-(lower-alkanoyloxy lower-alkyl)-piperazino [e.g., N-(acetoxy-, isobutyroxy-, or octanoyloxyethyl or propyl)-piperazino]; lower-alkoxy-piperazino; N'-lower-alkoxy-lower-alkylpiperazino, e.g., N'-ethoxyethyl-piperazino; and lower-carbalkoxy-piperazino. The terms "lower-alkyl" and "lower-alkoxy," when employed herein, include both straight and branched chain radicals of not more than eight carbon atoms.

The symbol Y, where it appears in this specification, represents a lower-alkylene radical, i.e., a divalent saturated hydrocarbon radical having from one to six carbon atoms inclusive. The radical may be of straight or branched chain structure, preferably but not necessarily having the valences on terminal carbon atoms. Examples of lower-alkylene radicals are methylene, ethylene, 1,3-propylene, 1,2-propylene, 2-methyl-1,3-propylene, 1,4-butylene, 1,3-butylene, 2,3-butylene, 1,2-butylene, 3-methyl-1,4-butylene, pentylene, hexylene, 3-methyl-1,4-pentylene, and the like. In the compounds of the invention, radicals having a one or two carbon atom chain, such as ethylene, propylene, isopropylene and especially methylene, are preferred, these being the Y groups associated with propionic, butyric, isobutyric, and acetic acids, respectively.

The compounds of the invention are most conveniently employed in the form of non-toxic acid-addition salts. Such salts also have improved water-solubility. Although the non-toxic salts are preferred, any salt may be prepared for use as a chemical intermediate, as in the preparation of another but non-toxic acid-addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, and tartaric acid. The preferred acid addition salt is the hydrochloride.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

When there are two or more basic nitrogen atoms present in the compounds of the invention, poly-acid-addition salts may be obtained by employing the proper increased molar ratios of acid to the free base.

The compounds of the present invention are prepared by the esterification of 4-hydroxyalkyl-2-pyrrolidinones and 2-thionpyrrolidinones with aminoacids. Preferred alcohols are those having the formula:

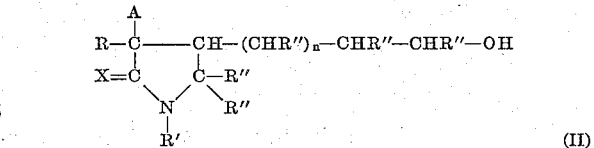

wherein the symbols have the values previously assigned.

Exemplary starting alcohols are:

4-(β-hydroxyethyl)-1,3-diisopropyl-3-phenyl-2-pyrrolidinone 4-(β-hydroxyethyl)-1-allyl-3-cyclohexyl-3-phenyl-2-pyrrolidinone 4-(β-hydroxyethyl)-1-phenethyl-3-methyl-3-phenyl-2-pyrrolidinone 4-(β-hydroxyethyl)-1-isopropyl-3-benzyl-3-phenyl-2-pyrrolidinone 4-(β-hydroxyethyl)-1-isopropyl-3-(2- or 3-thienyl)-3-phenyl-2-pyrrolidinone 4-(β-hydroxyethyl)-1-isopropyl-3-(2- or 3-thenyl)-3-phenyl-2-pyrrolidinone 4-(β-hydroxyethyl)-1-isopropyl-3-(p-methoxyphenyl)-3-phenyl-2-pyrrolidinone 4-(β-hydroxyethyl)-1-isopropyl-3-(m-chlorophenyl)-3-phenyl-2-pyrrolidinone 4(β-hydroxyethyl)-1-isopropyl-3-(o-methylphenyl)-3-phenyl-2-pyrrolidinone 4-(β-hydroxyethyl)-1-isopropyl-3,3-diphenyl-2-pyrrolidinone 4-(β-hydroxyethyl)-1-isopropyl-3-cyclopentyl-3-phenyl-2-pyrrolidinone 4-(γ-hydroxypropyl)-1-isopropyl-3,3-diphenyl-2-pyrrolidinone 4-(γ-hydroxypropyl)-1-isopropyl-3,3-diphenyl-5-methyl-2-pyrrolidinone 4-(γ-hydroxypropyl)-1-isopropyl-3,3-diphenyl-5,5-dimethyl-2-pyrrolidinone 4-(β-hydroxyethyl)-1-benzyl-3,3-diphenyl-5-methyl-2-pyrrolidinone 4(γ-hydroxypropyl)-1-methyl-3,3-diphenyl-2-pyrrolidinone 4(β-hydroxypropyl)-1-isopropyl-3,3-diphenyl-2-pyrrolidinone 4-(γ-hydroxy-2-propyl)-1-isopropyl-3,3-diphenyl-2-pyrrolidinone 4-(β-hydroxyethyl)-1-isobutyl-3,3-diphenyl-2-pyrrolidinone 4-(β-hydroxyethyl)-1-cyclohexyl-3,3-diphenyl-2-pyrrolidinone 4-(β-hydroxyethyl)-1-benzyl-3,3-diphenyl-2-pyrrolidinone 4-(β-hydroxyethyl)-1-isobutyl-3-(3-pyridyl)-3-phenyl-2-pyrrolidinone 4-(β-hydroxyethyl)-1-ethyl-3,3-diphenyl-2-pyrrolidinone 4-(β-hydroxyethyl)-1-benzyl-3,3-diphenyl-2-pyrrolidinone 4-(β-hydroxyethyl)-1-cyclohexyl-3,3-diphenyl-2-pyrrolidinone
4-(β-hydroxyethyl)-1-n-butyl-3-(3-pyridyl)-3-(p-methoxyphenyl)-2-pyrrolidinone
4-(β-hydroxyethyl)-1-ethyl-3-isopropyl-3-phenyl-2-pyrrolidinone
4-(β-hydroxyethyl)-1,3-diisopropyl-3-phenyl-2-pyrrolidinone
4-(γ-hydroxypropyl)-1,3-diisopropyl-3-phenyl-2-pyrrolidinone
4-(γ-hydroxypropyl)-1-isopropyl-3-methyl-3-phenyl-2-pyrrolidinone
4-(γ-hydroxypropyl)-1-isopropyl-3-cyclopentyl-3-phenyl-2-pyrrolidinone
4-(γ-hydroxypropyl)-1-isopropyl-3-cyclohexyl-3-phenyl-2-pyrrolidinone
4-(Δ-hydroxy-2-butyl)-1-isopropyl-3,3-diphenyl-2-pyrrolidinone
4-(γ-hydroxybutyl)-1-isopropyl-3,3-diphenyl-2-pyrrolidinone
4-(γ-hydroxy-2-methylpropyl) - 1-isopropyl-3,3-diphenyl-2-pyrrolidinone, the corresponding -2-thionpyrrolidinone compounds, and the like.

These alcohols may be employed per se or in the form of metal salts thereof, or in the form of their corresponding halides, as more fully disclosed hereinafter.

The starting aminoacids employed according to the invention are amino-lower-aliphatic acids, preferably having the formula:

(III)

wherein the symbols B and Y have the values given hereinbefore. These acids have a carboxy group attached to one carbon atom and an amino radical "B" on the same or another carbon atom. The carbon chain may be straight or branched and otherwise as indicated hereinbefore. Examples of amino-lower-aliphatic acids which may be employed as starting aminoacids include any of the common aminoacids as well as aminoacetic, γ-aminopropionic, β-aminoproponic, α-methyl-β-aminoproponic acid, γ-aminobutyric, β-methyl-γ-aminobutyric, β-aminobutyric, α-methyl-γ-aminobutyric, γ-aminovaleric, Δ-aminovaleric, and epsilon-aminocaproic, in which the amino radical may have any of the values previously indicated for "B" in the foregoing, and the like. Specific examples of aminoacids which may be employed in the present procedure include any of the common aminoacids, alpha-dimethylaminoacetic acid, alpha-methyl-alpha-diethylaminoacetic acid, alpha-methyl-beta-dimethylaminopropionic acid, beta-dimethylaminopropionic acid, gamma-dimethylaminobutyric acid, beta-methyl-ethylaminobutyric acid, alpha-methyl-beta-dimethylaminopropionic acid, gamma-piperidinobutyric acid, alpha-methyl-gamma-(2-methylpiperidino)-butyric acid, delta-(2,4-diethylpiperidino)-valeric acid, gamma-pyrrolidino-valeric acid, alpha-methyl-delta-(3-methylpyrrolidino)-valeric acid, gamma-methyl-delta-morpholinovaleric acid, alpha-methyl-delta-thiomorpholinovaleric acid, epsilon-N-methylpiperazinocaproic acid, and epsilon-(3-methylpiperazino)-caproic acid, to name a few. Numerous aminoacids are known compounds and may be employed per se, in the form of a metal or lower-alkyl alkoxide, or in the form of their acid halides, having the identical formula as (III) above but having a halogen atom in place of the hydroxy radical of the carboxy group.

The production of 4-amino-lower-alkanoyloxyalkyl-2-pyrrolidinones and -2-thionpyrrolidinones may be accomplished by conventional methods of esterification.

The process of preparing the compounds of the present invention comprises, in general, reacting a compound having the formula:

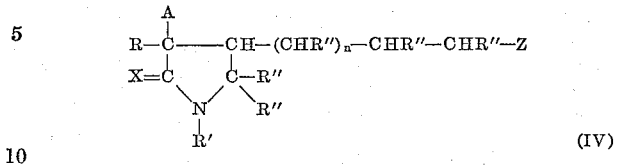

(IV)

wherein Z is hydroxy when Z' (below) is hydroxy, is hydroxy or metal alkoxide OMe when Z' is halogen, is hydroxy when Z' is alkoxy OR₁, and is halogen when Z' is metal alkoxide OMe, and wherein the other symbols have the values previously assigned, with a compound having the formula:

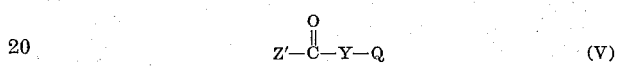

(V)

wherein Q is halogen or an amino radical, Y has the value stated earlier, and Z' is halogen, hydroxy, or a metal alkoxide radical OMe wherein Me is an alkali or alkaline earth metal, or an alkoxide radical OR₁ wherein R₁ is a lower-alkyl group, and the other symbols have the values stated previously, to split out water, hydrogen halide, a metal halide, or a lower-alkanol with concurrent production of the desired amino-alkanoyloxyalkyl compound, and subsequently, when Q is halogen, reacting the product with an amine.

Although the various aforementioned reactants may be reacted directly, the preferred methods are analogous to those employed for the preparation of peptides. For example, a free amino group of the acid may be protected by reacting it with an acylating agent such as acetyl chloride, carbobenzoyloxy chloride, or the like, so that the acyl halide may be prepared and subsequently reacted with the appropriate 4-hydroxyalkyl compound. The protecting acyloxy group may subsequently be removed by catalytic reduction or hydrolysis, usually with palladium and hydrogen or alcoholic alkali. When less reactive amine groups, such as dialkylamino and phenylamino, are present in the aminoacid molecule, such protection is not required under proper conditions.

The preferred manner of production is similar to Fischer's synthesis of peptides (Carl Noller, Chemistry of Organic Compounds, 2nd Ed., W. B. Saunders Co., Philadelphia, 1957, p. 305). A haloalkanoyl halide, e.g., an alkanoyl halide having the formula:

wherein X is halogen, preferably having an atomic weight greater than nineteen, and wherein Y and Z' have the values previously assigned, for example, alpha-chloroacetyl chloride, deta-chloropropionyl chloride, alpha-chlorobutyryl bromide, or the like, is reacted with the selected 4-hydroxyalkyl-2-pyrrolidinone or -2-thionpyrrolidinone according to conventional procedure for such reaction as illustrated in Example 1. The 4-aminoalkanoyloxyalkyl-2-pyrrolidinones and thion-pyrrolidinones may then be prepared by reacting the 4-haloalkanoyloxyalkyl compounds with the appropriate amine, such as lower-alkyl-amine, di-lower-alkyl-amine, lower-alkenyl-amine, di-lower-alkenyl-amine, phenyl-amine, (hydroxy - lower - alkyl) - amine, di - hydroxy-lower - alkyl - amine, lower - alkyl - (hydroxy - lower-alkyl)-amine, basic saturated monocyclic heterocyclic amines of less than twelve carbon atoms, as exemplified by piperidine, lower-alkyl piperidine, e.g., 2-, 3-, or 4-lower-alkyl-piperidine, di-lower-alkyl-piperidine, e.g., 2,4-, 2,6-, or 3,5-di-lower-alkyl-piperidine, lower-alkoxy-piperidine, pyrrolidine, lower-alkyl-pyrrolidine, di-lower-alkyl-pyrrolidine, lower-alkoxy-pyrrolidine, morpholine, lower-alkyl-morpholine, di-lower-alkyl-morpholine, lower-alkoxy-morpholine, thiomorpholine, lower-alkyl-thiomorpholine, di-lower-alkyl-thiomorpholine, lower-alkoxy-thiomropholine, piperazine, lower-alkyl-piperazine, (e.g., C- or $N^4$-methyl-piperazine), di-C-(lower-alkyl)-piperazine, $N^4$-(lower-alkyl)-C-(lower-alkyl)-piperazine, N-(hydroxy-lower-alkyl)-piperazine, N - (lower - aliphatic-acyloxy lower-alkyl)-piperazine, e.g., N-(acetoxy, isobutyryloxy, or octanoyloxyethyl or propyl)-piperazine, lower-alkoxy-piperazine, N'-lower-alkoxy - lower - alkyl-piperazine, e.g., N'-ethoxyethylpiperazine, or lower-carbalkoxy-piperazine, and the like. The terms lower-alkyl and lower-alkoxy, when employed herein, include both straight and branched chain radicals of not more than eight carbon atoms. The haloalkanoylation step may be carried out in a suitable reaction solvent, e.g., an aromatic hydrocarbon such as benzene, an alcohol such as ethanol, or in an excess of the amine itself. A reaction temperature from about 10 to about 120 degrees centigrade is usually employed, preferably from about room temperature to about 60 degrees centigrade, and a reaction period of about eight to twenty-four hours, usually no more than twelve hours, is usually adequate. Temperatures at or near room temperature are adequate; higher reaction temperatures increase the speed of reaction but tend to increase the incidence of side reactions. Pressure to the extent generated in a sealed system may be employed to facilitate the reaction. The reaction may be conveniently followed by observing the conversion of the carbonyl halide group to the ester group by means of the infrared absorption spectrum.

The intermediate 4-haloalkanoyloxyalkyl ester is usually reacted directly without prior isolation with the selected amine. The amine is usually employed in excess, at least two molar equivalents being preferred per each molar equivalent of starting 4-haloalkanoyloxyalkyl ester. A temperature at or near room temperature, usually 20 to 50° C., is convenient. Reaction periods of 8 to 24 hours, usually not greater than 12 hours, are required. Longer or shorter reaction periods and lower or higher temperatures up to about 120° C. may also be employed. The resulting solution of the amine reaction product is concentrated, as in vacuo, and the amine product isolated, usually as the crystalline hydrohalide salt corresponding to the halogen in the starting haloester compound. Alternatively, the resulting product may be isolated by extraction, as with aqueous hydrochloric acid, basification of the acid extract, as with aqueous alkali, and extraction of the organic base with a water-insoluble solvent. The solvent is then concentrated and the residual free-base product crystallized from a suitable solvent or distilled in vacuo. The free base may then be converted to a pharmaceutically acceptable acid addition salt in the usual manner. In cases where a crystalline salt is difficult or impossible to obtain, the free basic aminoester itself may be crystallized from a solvent or solvent mixture or alternatively isolated as an oil by fractional distillation. Extraction of the reaction product, as the free basic aminoester, with a suitable solvent, e.g., ether, benzene, toluene, or ethylacetate, frequently assists in recovering all of the available product for isolation by crystallization or the like. Where the product is isolated as a salt and the free base is desired, this may be obtained conventionally by neutralizing a solution of the isolated salt with a base such as ammonia, ammonium hydroxide, sodium carbonate, or other suitable alkaline material, extracting the liberated base with a suitable solvent such as ethylacetate or benzene, drying the extract and evaporating to dryness in vacuo or fractionally distilling, or in other conventional manner.

One method of preparing the desired esters is to convert a starting aminoalkanoic acid, with or without prior protection of the amine group, as required, to the acid halide by treatment with at least a molecular equivalent of a halogenating agent, e.g., thionyl chloride, hydrogen chloride, hydrogen bromide, phosphorous tribromide, phosphorous oxychloride, or phosphorous pentachloride, alone or in the presence of a solvent which is inert to the reaction system, e.g., benzene, chloroform, or the like. The reaction time is usually about one hour. The reaction is generally continued until the infrared spectrum of the solution indicates complete conversion of the carboxyl group to the carbonyl halide group. The acid halide may be isolated, but need not be.

When a molecular equivalent, or a slight excess, of halogenating agent has been used, the resulting solution of the aminoalkanoyl halide may be reacted directly with at least a molecular equivalent of the 4-hydroxyalkyl compound at such a temperature and addition rate that the reaction is easily controlled. Temperatures of zero to fifty degrees centigrade are convenient; considerably broader ranges can be used. Completion of reaction is usually assured by refluxing for a period of up to about one hour or longer if desired. When an excess of halogenating agent is used, the excess is usually removed at reduced pressure before reaction of the 4-hydroxyalkyl-2-pyrrolidinone with the aminoalkanoyl halide. After complete reaction the mixture is concentrated in vacuo and the resulting hydrohalide salt of the desired 4-aminoalkanoyloxyalkyl compound crystallized from a suitable solvent. In cases where the salt fails to crystallize or when it is desirable to isolate the free base, the hydrohalide salt may be converted to the free base by partition between an alkaline aqueous solution and a water-insoluble solvent, concentration of the solvent, and crystallization and/or vacuum distillation of the free base. The base may then be converted to an acid-addition salt by reaction with an acid as hereinafter described.

Another method of producing the desired 4-aminoalkanoyloxyalkyl compounds is by the direct esterification of the starting 4-hydroxyalkyl compounds. This esterification may be carried out in the presence of a suitable esterification catalyst, e.g., hydrogen chloride, sulfuric acid, cation exchange resins, or an aromatic sulfonic acid such as benzene or p-toluene sulfonic acid, preferably with removal of the water of reaction as formed if optimum yields are desired. Example 7 is illustrative.

Although the preferred manner of preparing the compounds of the invention is as stated in the foregoing, they may be prepared in other conventional ways. The 4-aminoalkanoyloxyalkyl-2-pyrrolidinones and thionpyrrolidinones may for example be prepared from selected 4-haloalkyl-2-pyrrolidinones and thionpyrrolidinones by conventional displacement reaction, as with an appropriate alkali metal salt of the acid, e.g., a sodium alkanoate such as a sodium alpha-aminoacetate or the like, preferably in dimethyl formamide solvent according to standard procedure. Example 9 is illustrative.

Alternatively, a lower-alkyl ester of the aminoalkanoic acid may be reacted with the 4-hydroxyalkyl-2-pyrrolidinone or 2-thionpyrrolidinone. Moreover, metal alcoholates of the 4-hydroxyalkyl compounds may alternatively be employed for reaction with the aminoalkanoyl halides. The preferred metal alcoholates are the alkali and alkaline earth metal alcoholates.

The method of preparing the compounds of the present invention, then, in its broader aspects, comprises reacting a compound having the Formula IV with a compound having the Formula V, both as given previously.

The starting 4-hydroxyalkyl - 2 - pyrrolidinones and -2-thionpyrrolidinones may be prepared by the hydrolysis of the corresponding 4-acyloxyalkyl-2-pyrrolidinone or -2-thionpyrrolidinone. These in turn may be prepared by the reaction of an alkali metal salt of an organic acid with the appropriate 4-haloalkyl-2-pyrrolidinone or -2-thionpyrrolidinone. The thionpyrrolidinone is the reaction product of the corresponding pyrrolidinone and phosphorus pentasulfide. The 4-haloalkyl-2-pyrrolidinones result from the rearrangement of the corresponding alpha-(1-substituted-3-pyrrolidyl)-alpha,alpha-disubstituted acetic acid which is in turn prepared from the appropriate acetonitrile.

STARTING 4-HYDROXYALKYL COMPOUNDS

The starting 4-hydroxyalkyl compounds may be prepared by direct hydrolysis of the corresponding 4-haloalkyl compound according to conventional basic hydrolysis procedure, but yields are less than optimum and it is therefore preferred to convert the 4-haloalkyl compound to an acyloxy, e.g., lower-alkanoyloxy such as acetoxy, compound and thereafter hydrolyze according to conventional basic hydrolysis procedure to the hydroxy group, which has the advantage of excellent yields. The 4-($\beta$-hydroxyethyl) derivatives may, for example, be conveniently prepared by hydrolyzing the acetates with aqueous sodium hydroxide as in Preparation 15.

The 4-acyloxyalkyl-2-pyrrolidinone compounds are prepared either from the selected 4-haloalkyl-2-pyrrolidinone by conventional displacement route, as with an appropriate alkali metal salt of the selected acid, e.g., a sodium alkanoate such as sodium acetate or the like, preferably in dimethylformamide solvent, according to standard procedure, as indicated by Preparation 16, or by the direct route involving acylation of a starting trisubstituted acetic acid with an appropriate acid anhydride to produce the mixed anhydride, in this case the acylate, and then continuing the reaction in the presence of suitable solvent, e.g., more of the acid anhydride, with heating to cause rearrangement thereof to the desired 4-acyloxyalkyl-2-pyrrolidinone. The direct acylation reaction via rearrangement of the acid acylate is illustrated by Preparation 17. The 4-acyloxyalkyl-2-thionpyrrolidinone compounds are prepared, in the manner of Preparations 16, 20, and 21, by the conventional displacement route as disclosed in the foregoing, from the corresponding 4-haloalkyl-2-thionpyrrolidinone compounds.

The 4-hydroxyalkyl-3,3-disubstituted-1-substituted-2-thion-pyrrolidinones are prepared from the corresponding 4-haloalkyl or 4-acyloxyalkyl-2-thionpyrrolidinone compound in the manner of Preparations 15, 18, and 19 according to the general procedure given in the foregoing.

Alternatively, the 4-hydroxyalkyl compounds may be prepared by reduction of an appropriate priopionyl or butyryl halide, as with sodium borohydride, as indicated hereinafter under *Chain Extension* and illustrated by Preparation 6.

The 4-carboxyalkyl compounds and their acid halides are obtained by hydrolysis of the corresponding 4-cyanoalkyl-3,3-disubstituted-1-substituted-2-pyrrolidinones and 2-thionpyrrolidinones. These, in turn, may be prepared by reaction of an alkali metal cyanide with the appropriate 4-haloalkyl-2-pyrrolidinone or 2-thionpyrrolidinone.

The complete procedure is more fully disclosed in the following.

STARTING ACETONITRILES

The alpha-(1-substituted-3-pyrrolidyl)-alpha, alpha-disubstituted (e.g., benzyl phenyl, methyl phenyl, or diphenyl) acetonitriles are generally prepared by alkylating an alkali metal, e.g., sodium, salt of the appropriate alpha,alpha-disubstituted-acetonitrile, e.g., benzylphenylacetonitrile, methylphenylacetonitrile, or diphenylacetonitrile, with the appropriate 1-substituted-3-halo (e.g., chloro)-pyrrolidine in a suitable solvent such as dry toluene. The sodium salt of the alpha, alpha-disubstituted-acetonitrile is formed by the reaction of the nitrile with sodium amide in the dry solvent, e.g., toluene. The condensation with the 3-halopyrrolidine is usually carried out with the application of heat, e.g., in refluxing benzene, toluene, or a like solvent, for an extended period, e.g., approximately three hours. The solvent, e.g., benzene, solution is then washed with water and the product extracted, as with 1 N hydrochloric acid. This acid extract may then be basified, for example with sodium hydroxide, extracted with a water-insoluble solvent such as ether or chloroform, the solution washed and dried, as over sodium sulfate, concentrated, and the residue distilled in vacuo. This alkylation procedure is illustrated by the following Preparation 1.

1-substituted-3-halopyrrolidines which may be used as intermediates in preparing starting acetonitriles are those tertiary pyrrolidines which have a halogen bonded to the heterocyclic ring in the three position. Exemplary 1-substituted-3-halopyrrolidines are 1-methyl-3-chloropyrrolidine, 1-ethyl-3-bromopyrrolidine, 1-propyl-3-iodopyrrolidine, 1-isopropyl-3-chloropyrrolidine, 1-cyclohexyl-3-chloropyrrolidine, 1-phenethyl-3-bromopyrrolidine, 1-benzyl-3-chloropyrrolidine, and the like. The 1-substituted-3-halopyrrolidines may also have one or more methyl groups bonded to the ring in any one or more than one position, illustratively the 2, 4, or 5 positions, for example 1-ethyl-3-chloro-4-methylpyrrolidine, 1-isopropyl-2-methyl-3-iodo-pyrrolidine, 3-chloro-1,5-dimethylpyrrolidine, 1,2,5-, 1,2,4-, or 1,2,2-trimethyl-3-chloropyrrolidine, and the like. A suitable method for the preparation of starting 1-substituted-3-halopyrrolidines is found in the Journal of Medicinal and Pharmaceutical Chemistry 2, 523 (1960). Such starting 3-halopyrrolidines, methyl-3-halopyrrolidines and polymethyl-3-halopyrrolidines may also be prepared by standard procedure from certain methyl-3-pyrrolidinols disclosed by C. W. Ryan et al., J. Org. Chem. 27, 2901–2905 (1962), or certain related compounds disclosed by Lunsford in U.S. Patent 2,830,997 and in other sources cited therein. The methyl substituents in the starting substituted acetonitrile and in the prior 1-substituted-3-halopyrrolidine intermediate appear as substituents in the final pyrrolidinone, e.g., the 4-hydroxyalkyl-2-pyrrolidinone and 2-thionpyrrolidinone compounds having a 3-methyl substituent are prepared from a starting alpha-methylacetonitrile, those having a 5-methyl substituent are prepared from a 2-methyl-3-halopyrrolidine, and those having side-chain methyl substituents (such as the gamma-hydroxy-2-propyl or beta-hydroxypropyl compounds) are prepared from 4- and 5-methyl substituted-3-halopyrrolidines.

4-HALOALKYL-2-PYRROLIDINONES

The 4-haloalkyl-3,3-disubstituted-1-substituted-2-pyrrolidinones may be prepared by the rearrangement of the acid via the acyl halide. The acid may be prepared directly from the acetonitrile by hydrolysis, or it may be prepared by hydrolysis of the intermediate amide which in turn may be prepared from the acetonitrile by a partial hydrolysis.

In preparing the 4-haloalkyl compounds from the alpha-(1-substituted-3-pyrrolidyl)-alpha, alpha-disubstituted acetonitriles, the nitrile is first hydrolyzed to the corresponding acid by the action of a strong mineral acid, e.g., concentrated sulfuric acid, for example, approximately sixty to eighty percent, preferably seventy percent, or concentrated (e.g., near 35 percent) hydrochloric acid. Usually this hydrolysis is readily effected by heating at a relatively high temperature, e.g., 100 to 140, preferably 130 to 140 degrees centigrade, for an extended period of time, e.g., from five to 48 hours. Lower temperatures increase the required reaction period, higher temperatures may shorten it somewhat but are not recommended since decarboxylation may occur from excessive reaction temperatures or periods and the incidence of undesired side-reactions, e.g., sulfonation, is thereby also increased. Upon completion of the hydrolysis, the solution of the acid may be cooled, as by pouring onto ice, and basified with an alkali, e.g., sodium or potassium hydroxide, ammonium hydroxide, or the like, and extracted with an appropriate organic solvent. Halogenated organic solvents such as chloroform, ethylene dichloride, and the like are preferred. The resulting solution of the basic salt is then acidified, as with an anhydrous mineral acid, preferably by passing anhydrous hydrogen chloride gas into the solution, the solution of the resulting acid salt dried with a conventional drying agent such as sodium sulfate, magnesium sulfate, calcium chloride, or the like, and finally concentrated to leave the crude salt of the acid.

The residual acid salt may be converted without isolation to the corresponding mixed anhydride, i.e., the acyl halide, and then rearranged to the 4-haloalkyl-2-pyrrolidinone. In such case, the residual acid salt is usually heated, preferably under reflux, with an acid anhydride capable of forming a mixed anhydride therewith, together with a halogen ion (which halogen ion may either be added to the reaction or generated in situ), for example, with thionyl chloride, phosphorous trichloride, corresponding bromides such as phosphorous tribromide and thionylbromide, or the like, until disappearance of the characteristic acyl halide carbonyl frequency from the infrared spectrum, usually for a period of two to three hours, during which reaction the acid first converts to the acid halide and then rearranges to the 4-haloalkyl-2-pyrrolidinone. Halides of strong acids are preferred, and temperatures up to about 100 degrees centigrade are usually employed.

The acyl halides or other mixed anhydrides are unstable even at room temperature and rearrange readily upon heating. It is therefore most convenient to continue heating of the reaction product containing the same, in the presence of the selected halide ion, without any attempt at isolation, until establishment of the characteristic pyrrolidinone carbonyl frequency, indicative of completion of the preparation of the desired 4-haloalkyl-2-pyrrolidinone via the rearrangement mechanism.

When the acid anhydride is used as solvent as well as a reactant, a considerable excess may be and frequently is employed, although when the anhydride is acetic or other lower-aliphatic, preferably lower-alkanoic, acid anhydride, as in cases when a halogen anion is extraneously introduced into the reaction mixture, a polar solvent such as methyl ethyl ketone may be used to facilitate solution of the anion introduced. After completion of the reaction, any excess reagent may be removed from the organic product under vacuum and the residue crystallized from an appropriate solvent or solvent mixture. The crystallized product from this reaction sequence is the desired 4-haloalkyl-3,3-disubstituted-1-substituted-2-pyrrolidinone. This procedure is illustrated by the following Preparation 2.

4-HALOALKYL-2-THIONPYRROLIDINONES

The 4 - haloalkyl - 3,3 - disubstituted - 1 - substituted-2-thionpyrrolidinones may be prepared by the reaction of a corresponding 2-pyrrolidinone with phosphorous pentasulfide ($P_2S_5$). The 4-cyanoalkyl-2-thionpyrrolidinones can be prepared in the same manner. The conditions of this reaction may vary considerably, but in general are as follows:

A suspension of the 2-pyrrolidinone and an intimate mixture of phosphorus pentasulfide and potassium sulfide in an inert solvent, usually an approximately 0.4 molar quantity of phosphorous pentasulfide together with an equal weight of potassium sulfide in dry toluene (approximately four liters of dry toluene ordinarily being used per mole of pyrrolidinone), is stirred and refluxed for an extended period, usually about 15 to 24 hours. Usually the mixture is then decolorized with activated charcoal and filtered while hot. In some cases, the resulting 2-thionpyrrolidinone precipitates from solution upon cooling and is removed by filtration and recrystallized from an appropriate solvent. In other cases, the toluene filtrate is concentrated in vacuo and the residual crude thionpyrrolidinone is crystallized and may be recrystallized from an appropriate solvent.

The procedure is essentially that described generally by R. N. Hurd and G. De La Mater, Chemical Reviews 61, 45 (1961) for the conversion of amides to thionamides. However, these authors state that a reaction time of approximately one hour is usually sufficient, while conversion of the 2-pyrrolidinones of the present series to 2-thionpyrrolidinones appears to require a reaction time of about 15 to 24 hours in most cases.

The procedure for the conversion of 2-pyrrolidinones to the corresponding 2-thionpyrrolidinones is illustrated by the following Preparations 10 and 11.

4-CYANOALKYL COMPOUNDS

The 4-cyanoalkyl-2-pyrrolidinones and 2-thionpyrrolidinones are prepared by reacting the corresponding 4-haloalkyl compounds with an alkali metal cyanide, e.g., sodium cyanide, usually by heating the reactants together in a suitable organic solvent, preferably dimethylformamide or the like. This procedure can be applied equally well to 4-(beta-haloalkyl) compounds and to 4-(gamma-haloalkyl) compounds in each case to introduce the cyano group in place of the halogen atom, and thus to extend the 4-alkyl carbon chain. Representative examples of this procedure are given in Preparations 3 and 8.

4-CARBOXYALKYL COMPOUNDS

The 4-carboxyalkyl-2-pyrrolidinones and 2-thionpyrrolidinones are prepared by conventional acid hydrolysis of the corresponding 4-cyanoalkyl compounds, employing sulfuric acid, for example, approximately sixty to eighty percent, preferably seventy percent, aqueous sulfuric acid, or concentrated hydrochloric acid. This hydrolysis is usually effected by heating at a temperature not in excess of 100 degrees centigrade for a period of 24 hours. Upon completion of the hydrolysis, the solution of the acid may be cooled, as by pouring onto ice, and basified with an alkali, e.g., sodium or potassium hydroxide, ammonium hydroxide, or the like, and extracted with an appropriate organic solvent. Halogenated organic solvents such as chloroform, ethylene dichloride, and the like are preferred. The resulting solution of the basic salt is then acidified, as with an anhydrous mineral acid, preferably by passing anhydrous hydrogen chloride gas into the solution, the resulting solution of the acid salt dried with a conventional drying agent such as sodium sulfate, magnesium sulfate, calcium chloride, or the like, and finally concentrated to leave the crude salt of the acid. This or equivalent procedure is illustrated by the following Preparations 4, 9, 12, 13, and 14.

4-CARBONYL HALIDE COMPOUNDS

The pyrrolidinone or thionpyrrolidinone-4-alkanoic acids may if desired be converted to the corresponding acyl halides by reaction with a suitable halogenating agent such as thionyl chloride or bromide, phosphorus trichloride or tribromide, or the like, in the usual manner for forming acid halides, and the product crystallized from a suitable organic solvent such as benzene. Representative procedure is given in Preparation 5.

CHAIN EXTENSION AND METHYL SUBSTITUTION

In the event it is desired that the carbon chain at the 4-position of the pyrrolidinone nucleus contain more than two carbon atoms in a straight chain, this is conveniently accomplished by starting with the appropriate propionyl halide and reducing it to the corresponding 4-hydroxyalkyl compound, as with sodium borohydride, in accordance with conventional procedure, as illustrated by Preparation 6. The 4-(omega-hydroxyalkyl) compound is then reacted with a halogenating agent, e.g., thionyl chloride, phosphorous trichloride, the corresponding bromo reagents, or the like, to replace the hydroxy group by a halogen atom and produce the corresponding omega-haloalkyl compound in accord with Preparation 7. These omega-haloalkyl compounds may then be converted to nitriles having an additional carbon atom in the carbon chain (e.g., Preparation 8), which nitriles may then be converted to the acid, acid halide, and then hydroxy compound, all according to previously disclosed procedure (e.g., Preparations 4, 5, and 6).

The starting 4-hydroxyalkyl compounds having methyl groups in various positions of the pyrrolidinone nucleus and side chain are prepared by the employment of a selected methyl-substituted acetonitrile in the first step of the process, as already outlined under "Starting Acetonitriles." In addition, the 4-(4-hydroxy-2-butyl), 4-(3-hydroxy-2-methylpropyl), and the 4-(3-hydroxybutyl) compounds are prepared, in the first two cases by reducing the corresponding carbonyl chloride compound with sodium borohydride, while in the last case the hydroxy compound is produced by reaction of the corresponding 4-(beta-formylethyl) compound (prepared by reduction of the corresponding carbonyl chloride) with a methyl magnesium halide under usual Grignard reaction conditions. The carbonyl chlorides are prepared from the corresponding acids in accord with the foregoing disclosure and particularly in accord with Preparation 5 following. The acids are prepared by hydrolysis of the corresponding nitrile, in turn prepared from the corresponding chlorocompound and sodium cyanide, the chloro compound being produced from the corresponding hydroxy compound having one less carbon atom than the ultimate hydroxy compound.

The following preparations and examples are given by way of illustration only and are not to be construed as limiting.

PREPARATION 1

*Alpha - (1-isobutyl-3-pryrolidyl)-alpha,alpha-diphenylacetonitrile.*—A suspension of the sodium salt of diphenylacetonitrile was formed by the dropwise addition at fifty degrees centigrade of 193 grams (1.0 mole) of diphenylacetonitrile to a stirred suspension of 43 grams (1.1 mole) of sodium amide in one liter of dry toluene. After addition was complete, the mixture was refluxed for four hours and then, to the refluxing mixture, 162 grams (1.0 mole) of 1-isobutyl-3-chloropyrrolidine was added at a rapid dropwise rate with continuous stirring. After addition was complete, stirring and refluxing were continued for three hours. The mixture was then cooled and extracted with 1 N hydrochloric acid. The aqueous layer together with an oil layer were separated, made basic with dilute sodium hydroxide, and extracted with ether. The ethereal solution was dried over sodium sulfate and concentrated and the residue distilled in vacuo. Yield 250 grams (78 percent) boiling point 190 to 200 degrees centigrade at 0.15 millimeter of mercury. The material crystallized from a four to one ethanol and water mixture. Melting point 76 to 77 degrees centigrade.

The corresponding 1-isopropyl compound is prepared in the same manner. Melting point 73 to 74 degrees centigrade.

PREPARATION 2

*4 - (beta - chloroethyl) - 3,3-diphenyl-1-isobutyl-2-pyrrolidinone.*—A solution of 100 grams (0.314 mole) of alpha - (1-isobutyl-3-pyrrolidyl)-alpha,alpha-diphenylacetonitrile in 500 grms of seventy percent sulfuric acid was heated at 130 to 140 degrees centigrade for 48 hours, poured onto ice, made basic with sodium hydroxide, and extracted with chloroform. The chloroform solution was acidified with hydrogen chloride gas, dried over sodium sulfate, and concentrated. The residue was refluxed in 500 milliliters of thionyl chloride for three hours, the resulting solution was concentrated in vacuo, and the residue was crystallized from isopropyl ether. Yield 69 grams (62 percent); melting point 113–113.5 degrees centigrade.

The corresponding 1-isopropyl compound is prepared in the same manner. Melting point 106 to 108 degrees centigrade.

A tabulation of suitable 4-(haloalkyl)-3,3-disubstituted-1-substituted-2-pyrrolidinones prepared in this manner includes:

*Table I*

4-(BETA-HALOETHYL)-3,3-DISUBSTITUTED-1-SUBSTITUTED-2-PYRROLIDINONES

| Substituent at position— | | | Halogen | M.P., °C. |
|---|---|---|---|---|
| 1 | 3 | 3 | | |
| $CH_3$ | $C_6H_5$ | $C_6H_5$ | Cl | 140–1 |
| $C_2H_5$ | $C_6H_5$ | $C_6H_5$ | Cl | 117–9 |
| $C_2H_5$ | $C_6H_7$ | $C_6H_5$ | Br | 129–30 |
| $i-C_3H_7$ | $C_6H_5$ | $C_6H_5$ | Cl | 106–8 |
| $i-C_3H_7$ | $C_6H_5$ | $CH_3$ | Cl | 102–4 |
| $i-C_3H_7$ | $i-C_3H_7$ | $C_6H_5$ | Cl | 95–6 |
| $i-C_3H_7$ | $C_6H_5$ | $C_5H_9$ | Cl | 74.5–75 |
| $i-C_3H_7$ | $C_6H_{11}$ | $C_6H_5$ | Cl | 109–11 |
| $i-C_4H_9$ | $C_6H_5$ | $C_6H_5$ | Cl | 113.5–4.5 |
| $cy-C_6H_{11}$ | $C_6H_5$ | $C_6H_5$ | Cl | 151–2 |
| $C_6H_5CH_2$ | $C_6H_5$ | $C_6H_5$ | Cl | 110 |
| $i-C_3H_7$ | $C_6H_5$ | $C_6H_5$ | I | 147–149 |
| $i-C_3H_7$ [a] | $C_6H_5$ | $C_6H_5$ | Cl | 85–86.5 |
| $C_2H_5$ | $C_6H_5$ | 3-pyridyl | Cl | 100–103 |
| $C_2H_5$ [b] | $C_6H_5$ | $C_6H_5$ | Cl | 150–153 |
| $C_2H_5$ [c] | $C_6H_5$ | $C_6H_5$ | Cl | 141–142 |

[a] 4-(gamma-chloropropyl) compound.
[b] 4-(gamma-chloro-2-propyl) compound.
[c] 4-(beta-chloropropyl) compound.

PREPARATION 3

*3,3 - diphenyl - 1-isopropyl-2-pyrrolidinone-4-propionitrile.*—A mixture of 342 grams (1.0 mole) of 4-(beta-chloroethyl) - 3,3 - diphenyl-1-isopropyl-2-pyrrolidinone and 75 grams (1.5 mole) of sodium cyanide in one liter of dimethylformamide was stirred and heated to a temperature of 100° C. over a one-hour period, and this temperature was maintained for an additional three hours. The mixture was poured into ice water and the precipitated white crystalline solid filtered and recrystallized from isopropanol. Yield, 288 grams (87 percent); melting point 150 to 151 degrees centigrade.

The corresponding 1-ethyl-4-(3-cyano-2-propyl) compound is prepared in the same manner from 4-(3-chloro-2 - propyl) - 3,3 - diphenyl-1-ethyl-2-pyrrolidinone. The compound has a melting point of 177 to 180 degrees centigrade. Additional nitriles are prepared in the same manner from the halides of Table I.

PREPARATION 4

*3,3 - diphenyl - 1-isopropyl-2-pyrrolidinone-4-propionic acid.*—A mixture of 94 grams (0.28 mole) of 3,3-diphenyl - 1 - isopropyl-2-pyrrolidinone-4-propionitrile and 500 milliliters of 70 percent sulfuric acid was stirred and heated at 80 to 90 degrees centigrade for 24 hours and poured into ice and water. The precipitated solid was filtered and recrystallized from a chloroform-ligroin mixture. Yield, 93 percent; melting point 175 to 176 degrees centigrade.

The corresponding 1-ethyl-4-(3-carboxy-2-propyl) compound is prepared in the same manner. Additional acids are prepared in the same manner from the halides of Table I via the intermediate nitrile.

PREPARATION 5

*3,3 - diphenyl - 1-isopropyl-2-pyrrolidinone-4-propionyl chloride.*—A suspension of 144 grams (0.41 mole) of 3,3-diphenyl-1-isopropyl-2-pyrrolidinone-4-propionic acid in 500 milliliters of dry benzene was treated with 97.5 grams (0.82 mole) of thionyl chloride at 20 to 25 degrees centigrade dropwise and with stirring. The resulting solution was refluxed for one hour and concentrated in vacuo. The residue was crystallized from benzene. Melting point 141.5 to 143.5° C.

Additional acid halides are prepared in the same manner from the corresponding acids.

PREPARATION 6

*3,3 - diphenyl - 4 - (gamma-hydroxypropyl)-1-isopropyl-2-pyrrolidinone.*—To a suspension of ten grams of sodium borohydride in 100 milliliters of dry dioxane was added rapidly and with stirring 25 grams (0.0675 mole) of 3,3 - diphenyl-1-isopropyl-2-pyrrolidinone-4-propionyl chloride in 200 milliliters of dry dioxane. The mixture was stirred at reflux for four hours, cooled to room temperature and 100 milliliters of water added carefully. The mixture was partitioned between 500 milliliters of water and 300 milliliters of chloroform; the water layers extracted with additional chloroform, the chloroform solutions combined, dried with anhydrous sodium sulfate and concentrated on a rotary evaporator. The residue was crystallized from 70 percent ethanol and recrystallized twice from isopropyl ether. Yield, ten grams (44 percent); melting point 142 to 143 degrees centigrade.

Additional hydroxyalkyl-2-pyrrolidinones and 2-thionpyrrolidinones are prepared in the same manner.

PREPARATION 7

*4 - (gamma - chloropropyl)3,3 - diphenyl-1-isopropyl-2-pyrrolidinone.*—A solution of 7.4 grams (0.062 mole) of thionyl chloride in fifty milliliters of chloroform was added dropwise to a solution of 10.5 grams (0.031 mole) of 3,3 - diphenyl - 4 - (gamma-hydroxypropyl)-1-isopropyl-2-pyrrolidinone and 4.9 grams (0.062 mole) of pyridine in 100 milliliters of chloroform with stirring and ice-bath cooling. When addition was complete the mixture was heated to reflux and maintained at reflux for five hours, and then cooled with an ice bath. Water (100 milliliters) was added with stirring followed by fifty milliliters of 3 N hydrochloric acid. The chloroform layer was separated, dried with anhydrous sodium sulfate and concentrated in vacuo and the residue crystallized from 150 milliliters of about sixty percent ethanol. Yield, eight grams (72.5 percent); melting point 85 to 86.5 degrees centigrade.

Additional haloalkyl 2-pyrrolidinones and 2-thionpyrrolidinones are prepared in the same manner from the corresponding hydroxy compounds.

PREPARATION 8

*3,3 - diphenyl - 1 - isopropyl-2-pyrrolidinone-4-butyronitrile. [4 - (3 - cyanopropyl)3,3 - diphenyl-1-isopropyl-2-pyrrolidinone].*—A mixture of 3.9 grams (0.08 mole) of sodium cyanide, 9.2 grams (0.026 mole) of 4-(gamma-chloropropyl) - 3,3 - diphenyl-1-isopropyl-2-pyrrolidinone and 100 milliliters of dimethylformamide was stirred at reflux for seventeen hours. The mixture was filtered and the filtrate was concentrated in vacuo. The residue was crystallized twice from isopropyl alcohol. Yield, five grams (55%); melting point 107 to 108 degree centigrade. A constant melting point of 126–127 degrees centigrade was obtained after several additional crystallizations.

Additional cyanoalkyl 2-pyrrolidinones and 2-thionpyrrolidinones are prepared in the same manner from the corresponding gamma-halo compounds.

PREPARATION 9

*3,3 - diphenyl - 1 - isopropyl-2-pyrrolidinone-4-butyric acid and its acid halides.*—This acid and acid chloride or other halide are prepared from the nitrile of Preparation 8 in the manner given in Preparations 4 and 5. Additional acids and acid halides are prepared from the corresponding nitriles in the same manner.

PREPARATION 10

*4 - (2 - chloroethyl) - 3,3-diphenyl-1-isopropyl-2-thionpyrrolidinone.*—A mixture of 150 grams (0.44 mole) of 4 - (beta - chloroethyl) - 3,3 - diphenyl-1-isopropyl-2-pyrrolidinone, 23.3 grams (0.105 mole) of phosphorus pentasulfide and 25 grams of potassium sulfide in 700 milliliters of dry toluene was refluxed and stirred for twenty-four hours. The mixture was filtered while hot and the filtrate treated with decolorizing charcoal, filtered again and allowed to cool. The product precipitated from the solution in near analytical purity. Yield, 88 grams (56 percent); melting point 148 to 150 degrees centigrade. After recrystallization from toluene the melting point was 149 to 151 degrees centigrade.

The 1-ethyl and 1-methyl compounds are prepared in the same manner from the corresponding 2-pyrrolidinones. Additional 4-haloalkyl-2-thionpyrrolidinone compounds are prepared in the same manner from the corresponding 2-pyrrolidinones.

PREPARATION 11

*4 - (2 - cyanoethyl)3,3-diphenyl-1-isopropyl-2-thionpyrrolidinone.*—A suspension of 166 grams (0.5 mole) of 4 - (2 - cyanoethyl) - 3,3-diphenyl-1-isopropyl-2-pyrrolidinone and an intimate mixture of 48.8 grams (0.22 mole) of phosphorus pentasulfide and 48.8 grams of potassium sulfide in two liters of dry toluene was stirred and refluxed for eighteen hours, filtered and the filtrate concentrated in vacuo. The residue was dissolved in hot isopropyl alcohol, treated with activated charcoal, filtered and allowed to cool, yielding 123 grams (70%) of the desired product; melting point 160 to 165 degrees centigrade. After one recrystallization from isopropyl alcohol, the melting point was 166 to 167 degrees centigrade.

The corresponding 1-ethyl, 1-methyl, and 1-cyclohexyl compounds are prepared in the same manner from the corresponding 2-pyrrolidinone. Additional 4-cyanoalkyl-2-thionpyrrolidinones are prepared in the same manner from the corresponding 2-pyrrolidinones. Alternatively, the 4-cyanoalkyl-2-thionpyrrolidinones are prepared from the 4-haloalkyl-2-thionpyrrolidinones by reaction with an alkali metal cyanide according to the procedure given for the 4-cyanoalkyl-2-pyrrolidinones (see Preparations 3 and 8) but under somewhat more stringent reaction conditions.

PREPARATION 12

*3,3 - diphenyl - 1 - isopropyl - 2 - thionpyrrolidinone-4-propionic acid and acid halides.*—A solution of 30 grams (0.086 mole) of 4-(2-cyanoethyl)-3,3-diphenyl-1-isopropyl-2-thionpyrrolidinone in 200 grams of 70% sulfuric acid was stirred and heated at 75 degrees centigrade for eighteen hours, poured onto ice and extracted with chloroform. The chloroform extract was dried over anhydrous sodium sulfate and concentrated in vacuo and the residue crystallized from 400 milliliters of toluene and recrystallized twice from the same solvent. Yield, 22 grams (70%); melting point 191 to 194 degrees centigrade. The acid halides are prepared in the manner of Preparation 5.

PREPARATION 13

*3,3 - diphenyl - 1 - ethyl-2-thionpyrrolidinone-4-propionic acid and acid halides.*—A solution of 0.1 mole of 4 - (2 - cyanoethyl) - 3,3 - diphenyl-1-ethyl-2-thionpyrrolidinone in 250 grams of 70% sulfuric acid is stirred and heated at 75 degrees centigrade for eighteen hours, poured onto ice and extracted with chloroform. The chloroform extract is dried over anhydrous sodium sulfate and concentrated in vacuo and the residue crystallized from an appropriate solvent, for example, toluene. The acid halides are prepared as indicated in Preparation 5.

PREPARATION 14

*3,3 - diphenyl - 1 - methyl - 2 - thionpyrrolidinone-4-propionic acid and 3,3-diphenyl-1-cyclohexyl-2-thionpyrrolidinone-4-propionic acid and acid halides.*—These compounds are prepared in the manner of Preparation 12 from 4 - (2 - cyanoethyl) - 3,3-diphenyl-1-methyl-2-thionpyrrolidinone and 4 - (2-cyanoethyl)-3,3-diphenyl-1-cyclohexyl-2-thionpyrrolidinone, respectively. The acid halides are prepared from the acids in the manner of Preparation 5. Additional 2-thionpyrrolidinone-4-alkanoic acids and acid halides are prepared in the same manner from the corresponding nitriles.

In the manner of the foregoing preparations, 4-(carboxyalkyl) - 3,3 - disubstituted - 1 - substituted-2-pyrrolidinones and 2-thionpyrrolidinones are prepared and, if desired, converted to their acid halides or other derivatives in conventional manner.

PREPARATION 15

*3,3-diphenyl-4-(2-hydroxyethyl)-1-isopropyl-2-pyrrolidinone.*—A solution of 34 grams (0.093 mole) of 4-(2-acetoxyethyl) - 3,3 - diphenyl-1-isopropyl-2-pyrrolidinone and four grams (0.1 mole) of sodium hydroxide in 450 ml. of ethanol and ten ml. of water was stirred and refluxed for one hour and concentrated in vacuo. The residue was partitioned between chloroform and water and the chloroform layer was washed with water, dried over anhydrous sodium sulfate and concentrated in vacuo. The residue crystallized and was recrystallized from aqueous ethanol. Yield 22 g. (73%); M.P. 180–182° C.

*Anal.*—Calculated: C, 77.98; H, 7.79; N, 4.33. Found: C, 78.25; H, 7.90; N, 4.32.

PREPARATION 16

*4-(2-acetoxyethyl)-3,3-diphenyl-1-isopropyl-2-pyrrolidinone.*—A mixture of eighteen grams (0.22 mole) of sodium acetate and seventy grams (0.205 mole) of 4-(2-chloroethyl)-3,3-diphenyl-1-isopropyl-2-pyrrolidinone in 500 ml. of dimethylformamide was stirred and refluxed for fifteen hours, partitioned between 500 ml. of water and 500 ml. of chloroform, and the layers separated. The chloroform layer was washed with water, dried over anhydrous sodium sulfate and concentrated in vacuo, and the residue crystallized from 85% aqueous methanol. Yield 54 g. (72%); M.P. 91–94° C.

PREPARATION 17

*4-(2-acetoxyethyl)-3,3 - diphenyl-1-isopropyl-2-pyrrolidinone.*—A mixture of 2.50 grams (0.0077 mole) of α,α-diphenyl - α - (1 - isopropyl-3-pyrrolidyl) - acetic acid and twenty ml. acetic anhydride was refluxed five hours. Water (60 ml.) was then added cautiously; an oil separated which crystallized on cooling. The solid was collected and recrystallized from methanol and water (2:1). Yield, 1.65 g. (59%); M.P. 92–94.5° C. A mixed melting point with an authentic sample was undepressed.

PREPARATION 18

*3,3 - diphenyl-4-(2-hydroxyethyl)-1-isopropyl-2-thionpyrrolidinone.*—A solution of 0.08 mole of 4-(2-acetoxyethyl) - 3,3-diphenyl-1-isopropyl-2-thionpyrrolidinone and 0.10 mole of sodium hydroxide in 250 ml. of ethanol and 10 ml. of water was stirred and refluxed overnight (15 hours) and concentrated in vacuo. The residue was crystallized and recrystallized from aqueous methanol. Yield 90%; M.P. 184–187° C.

*Anal.*—Percent calcd. for $C_{21}H_{25}NOS$: C, 74.29; H, 7.42; N, 4.13. Found: C, 74.01; H, 7.44; N, 4.10.

PREPARATION 19

*Other hydroxyethyl compounds.*—3,3-diphenyl-4-(2-hydroxyethyl)-1-ethyl-2-thionpyrrolidinone and 3,3-diphenyl-4-(2 - hydroxyethyl)-1-methyl-2-thionpyrrolidinone are prepared in the manner of Preparation 18 from the corresponding 4-(2-acetoxyethyl)-compounds.

PREPARATION 20

*4-(2-acetoxyethyl)-3,3-diphenyl-1-isopropyl-2-thionpyrrolidinone.*—A mixture of 0.11 mole of sodium acetate and 0.1 mole of 4-(2-chloroethyl)-3,3-diphenyl-1-isopropyl-2-thionpyrrolidinone in 250 ml. of dimethylformamide is stirred and refluxed for 15 hours, partitioned between 250 ml. of water and 250 ml. of chloroform and the layers separated. The chloroform layer is washed with water, dried over anhydrous sodium sulfate and concentrated in vacuo and the residue crystallized from an appropriate solvent, as in Preparation 16.

PREPARATION 21

*Other lower-alkanoyloxyalkyl compounds.*—4-(2-acetoxyethyl) - 3,2-diphenyl-1-ethyl-2-thionpyrrolidinone and 4-(2-acetoxyethyl) - 3,3-diphenyl-1-ethyl-2-thionpyrrolidinone are prepared in the manner of Preparation 20 from 4-(2-chloroethyl)-3,3-diphenyl-1-methyl-2-thionpyrrolidinone and 4-(2-chloroethyl)-3,3-diphenyl-1-ethyl-2-thionpyrrolidinone, and 4-(2-chloroethyl)3,3-diphenyl-1-ethyl-2-thionpyrrolidinone, respectively.

PREPARATION 22

*Additional 4-hydroxyalkyl compounds.*—Numerous additional 4-hydroxyalkyl compounds of Formula II herein, such as those representatively named after Formula II where it first appears, are prepared in the manner of Preparations 6, 15, 18, and 19, or by conventional basic hydrolysis of 4-haloalkyl compounds such as those of Preparations 2, 7, and 10.

EXAMPLE 1.—4-[2-(α-DIETHYLAMINOACETOXY)-ETHYL] - 1 - ISOPROPYL - 3,3 - DIPHENYL - 2 - PYRROLIDINONE

A solution of 8.65 grams (0.077 mole) of α-chloroacetyl chloride in 50 ml. of dry benzene was added dropwise with stirring and cooling at 15° C. to a solution of 25 grams (0.077 mole) of 3,3-diphenyl-4-(2-hydroxyethyl)-1-isopropyl-2-pyrrolidinone in 200 milliliters of dry benzene. After addition was complete the mixture was allowed to stir at 40° for 12 hours and concentrated in vacuo. The residue was dissolved in 200 milliliters of dry benzene and a solution of 16.8 grams (0.23 mole) of diethylamine in 40 milliliters of benzene was added while the temperature was maintained below 40°. The temperature was maintained at 40° for 12 hours and the mixture was extracted with dilute hydrochloric acid. The acid extracts were made basic with 6 normal sodium hydroxide and extracted with ether. The evaporation of the ethereal solution caused crystallization of the product which was recrystallized from isopropyl ether. Yield, 21.3 grams (63.5%); M.P. 91–92° C.

*Anal.*—Calcd. for $C_{27}H_{36}N_2O_3$: C, 74.27; H, 8.31; N, 6.42. Found: C, 74.16; H, 8.15; N, 6.24.

EXAMPLE 2.—4-{2-[α-(4 - METHYLPIPERAZINO)-ACETOXY] - ETHYL}-1-ISOPROPYL-3,3-DIPHENYL-2-PYRROLIDINONE DIHYDROCHLORIDE

The base was prepared in the manner of Example 1 from 3,3-diphenyl-4-(2-hydroxyethyl) - 1-isopropyl-2-pyrrolidinone, α-chloroacetyl chloride, and N-methylpiperazine. Yield, 68%. The dihydrochloride salt was formed by treating an ethanol-ethyl ether solution of the base with ethereal hydrogen chloride and recrystallizing the resulting solid from dry 2-butanone. M.P. 190–191 degrees centigrade.

*Anal.*—Calcd. for $C_{28}H_{39}Cl_2N_3O_3$: C, 60.86; H, 7.11; N, 7.60; Cl, 12.84. Found: C, 62.27; H, 7.30; N, 8.07; Cl, 13.60.

EXAMPLE 3.—4-[2 - (α - MORPHOLINOACETOXY)-ETHYL]-1-ISOPROPYL - 3,3 - DIPHENYL-2-PYRROLIDINONE

The base was prepared in the manner of Example 1 from 4-(2-hydroxyethyl)-1-isopropyl-3,3,diphenyl-2-pyrrolidinone, α-chloroacetyl chloride, and morpholine. The crude base (yield, 44%) was converted to the hydrochloride salt by treating an absolute ethanol solution thereof with hydrogen chloride gas and precipitation of the salt by addition of dry ethyl ether. The white crystalline solid was recrystallized from an ethanol-ethyl ether mixture; M.P. 203–204 degrees centigrade.

*Anal.*—Calcd. for $C_{27}H_{35}ClN_2O_4$: C, 66.58; H, 7.24; N, 5.75. Found: C, 66.44; H, 7.21; N, 5.75.

EXAMPLE 4.—4 - [2-(α-PYRROLIDINOACETOXY)-ETHYL]-1-ISOPROPYL-3,3-DIPHENYL-2-PYRROLIDINONE

This compound was prepared in the manner of Example 1 from 4 - (2-hydroxyethyl)-1-isopropyl-3,3 - diphenyl-2-pyrrolidinone, α-chloroacetyl chloride, and pyrrolidine. Yield, 51% M.P. after recrystallization from isopropyl ether 98–99 degrees C.

*Anal.*—Calcd. for $C_{27}H_{34}N_2O_3$: C, 74.62; H, 7.89; N, 6.45. Found: C, 74.52; H, 7.90; N, 6.52.

EXAMPLE 5.—4 - [2 - (α - PIPERIDINOACETOXY)-ETHYL] - 1 - ISOPROPYL-3,3-DIPHENYL-2-PYRROLIDINONE

This compound was prepared in the manner of Example 1 from 4-(2-hydroxyethyl)-1-isopropyl-3,3-diphenyl-2-pyrrolidinone, α-chloroacetyl chloride, and piperidine. Yield, 65%; M.P. after recrystallization from isopropyl ether 107–108 degrees centigrade.

*Anal.*—Calcd. for $C_{28}H_{36}N_2O_3$: C, 74.97; H, 8.09; N, 6.25. Found: C, 75.10; H, 8.14; N, 6.09.

EXAMPLE 6.—4-[2-(α - HEXAMETHYLENEIMINOACETOXY) - ETHYL]-1-ISOPROPYL-3,3-DIPHENYL-2-PYRROLIDINONE

This compound was prepared in the manner of Example 1 from 4-(2-hydroxyethyl)-1-isopropyl-3,3-diphenyl-2-pyrrolidinone, α-chloroacetyl chloride, and hexamethyleneimine. Yield, 52% M.P. after recrystallization from isopropyl ether 117–118° C.

*Anal.*—Calcd. for $C_{29}H_{38}N_2O_3$: C, 75.29; H, 8.28; N, 6.06. Found: C, 75.15; H, 8.26; N, 6.12.

EXAMPLE 7.—4-[2 - (α-MORPHOLINOACETOXY)-ETHYL] - 1 - ISOPROPYL - 3,3 - DIPHENYL - 2-PYRROLIDINONE

Hydrogen chloride was bubbled through a refluxing solution of 25 grams (0.077 mole) of 4-(2-hydroxyethyl)-1-isopropyl-3,3-diphenyl-2-pyrrolidinone and 14.5 g. (0.1 mole) of 4-morpholine-acetic acid (prepared according to Remijov and Khromov-Berisov, C.A. 48, 3908) in 500 ml. of chloroform over a five hour period. The solution was concentrated in vacuo and partitioned between ether and dilute hydrochloric acid. The acid extract was made basic with 6 N sodium hydroxide and extracted with ether. Evaporation of the ether caused crystallization of the product which was recrystallized from isopropyl ether. The material melted at 91–92° C. and the melting point was not depressed when mixed with the material prepared according to Example 3.

EXAMPLE 8.—4-[2 - (β - MORPHOLINOPROPIONOXY)-ETHYL] - 1 - ISOPROPYL - 3,3 - DIPHENYL-2-PYRROLIDINONE HYDROCHLORIDE

A solution of 12.7 grams (0.1 mole) of β-chloropropionyl chloride in 50 ml. of dry benzene was added dropwise with stirring and cooling at 15° C. to a solution of 32.5 grams (0.1 mole) of 4-(2-hydroxyethyl)-1-isopropyl-3,3-diphenyl-2-pyrrolidinone in 200 ml. of dry benzene. After addition was complete the mixture was allowed to stir at 40° for 12 hours and was then concentrated in vacuo. The residue was dissolved in 300 ml. of dry benzene and a solution of 26.1 g. (0.3 mole) of morpholine was added while the temperature was maintained below 40°. The temperature was maintained at 40° for 12 hours and the solution extracted with dilute hydrochloric acid. The acid extracts were made basic with 6 N sodium hydroxide and extracted with ether. The ethereal solution of the base was dried over anhydrous sodium sulfate. Addition of ethereal hydrogen chloride caused precipitation of the white salt which was recrystallized from butanone. Yield 52%; M.P. 227–230° C. More than one gram of the salt dissolves in 10 ml. of water to give a clear solution.

*Analysis.*—Calcd. for $C_{28}H_{37}ClN_2O_4$: C, 67.11; H, 7.44; N, 5.59. Found: C, 67.25; H, 7.52; N, 5.49.

EXAMPLE 9.—PROCESS VARIATION—4 - [2 - (α-MORPHOLINOACETOXY - ETHYL] - 1 - ISOPROPYL - 3,3 - DIPHENYL - 2 - PYRROLIDINONE HYDROCHLORIDE

A mixture of 18.3 grams (0.1 mole) of potassium 4-morpholinoacetate (prepared according to the method of Henry and Dehn, J.A.C.S. 72, 2804–6 (1950), or similar method) and 34.2 g. (0.1 mole) of 4-(2-chloroethyl)-1-isopropyl-3,3-diphenyl-2-pyrrolidinone in 500 ml. of dimethylformamide was stirred and refluxed for 15 hours and partitioned between 500 ml. of water and 500 ml. of chloroform. The chloroform layer was washed with water, dried over anhydrous sodium sulfate and concentrated in vacuo and the residue crystallized from isopropyl ether. The melting point, mixture melting point and infrared spectrum were identical to those obtained for the sample prepared in Example 3.

EXAMPLE 10.—PROCESS VARIATION—4 - [2 - (α-MORPHOLINOACETOXY) - ETHYL] - 1 - ISOPROPYL - 3,3 - DIPHENYL - 2 - PYRROLIDINONE HYDROCHLORIDE

Hydrogen chloride was bubbled through a refluxing solution of 25 grams (0.077 mole) of 4-(2-hydroxyethyl)-1-isopropyl-3,3-diphenyl-2-pyrrolidinone and 9.3 g. (0.1 mole) of α-chloroacetic acid in 500 ml. of chloroform for a 5 hour period and concentrated in vacuo. The residue was dissolved in 300 ml. of dry benzene and a solution of 26.1 g. (0.3 mole) of morpholine was added while the temperature was maintained below 40°. The temperature was maintained at 40° for 12 hours and the solution extracted with dilute hydrochloric acid. The acid extracts were made basic with 6 N sodium hydroxide and extracted with ether. Evaporation of the ether caused crystallization of the product. The melting point, mixture melting point and infrared spectrum were identical to those obtained for the sample prepared in Example 3.

EXAMPLE 11.—4 - [2 - (α - DIETHYLAMINOACETOXY)-ETHYL]-1-ISOPROPYL - 3,3 - DIPHENYL-2-THIONPYRROLIDINONE

In the same manner as given in Example 7, 4-[2-(α-diethylaminoacetoxy)-ethyl] - 1 - isopropyl - 3,3 - diphenyl-2-thionpyrrolidinone is prepared from 4-(2-hydroxyethyl)-1-isopropyl-3,3-diphenyl-2-thionpyrrolidinone, alpha-chloroacetyl chloride, and diethylamine.

EXAMPLE 12.—4 - [2 - ALPHA-DIMETHYLAMINOACETOXY)-ETHYL]-1-METHYL-3,3 - DIPHENYL-2-PYRROLIDINONE

In the same manner as given in Example 1, 4-[2-(alpha-dimethylaminoacetoxy)-ethyl]-1-methyl-3,3-diphenyl - 2-pyrrolidinone is prepared from 4-(2-hydroxyethyl)-1-methyl-3,3-diphenyl-2-pyrrolidinone, alpha - chloroacetyl chloride, and dimethylamine.

EXAMPLE 13.—4-{2-[ALPHA - (4 - PHENYLPIPERAZINO) - ACETOXY] - ETHYL} - 1 - ETHYL - 3,3-DIPHENYL-2-PYRROLIDINONE

In the same manner as given in Example 1, 4-{2-[alpha-(4 - phenylpiperazino) - acetoxy] - ethyl} - 1 - ethyl - 3,3-diphenyl-2-pyrrolidinone is prepared from 4-(2-hydroxyethyl)-1-ethyl-3,3-diphenyl-2-pyrrolidinone, alpha-chloroacetyl chloride, and 4-phenylpiperazine.

EXAMPLE 14.—4 - [2-(ALPHA-DIMETHYLAMINOPROPIONOXY)-PROPYL]-1-(n - BUTYL) - 3,3-DIPHENYL-2-PYRROLIDINONE

In the same manner as given in Example 1, 4-[2-(alpha-dimethylaminopropionoxy)-propyl] - 1 - (n-butyl)-

3,3-diphenyl-2-pyrrolidinone is prepared from 4-(2-hydroxypropyl)-1-(n-butyl)-3,3-diphenyl-2-pyrrolidinone, alpha-chloropropionyl chloride, and dimethylamine.

EXAMPLE 15.—4-[3-(α-MORPHOLINOACETOXY)-2-PROPYL]-1-ISOPROPYL-3,3-DIPHENYL-2-PYRROLIDINONE

In the same manner as given in Example 1, this compound is prepared from 4-(3-hydroxy-2-propyl)-1-isopropyl-3,3-diphenyl-2-pyrrolidinone, α-chloroacetyl chloride, and morpholine.

EXAMPLE 16

In the same manner as given in Example 1, 4-[2-(beta-dimethylaminopropionoxy)-ethyl]-3,3-diphenyl-1-allyl-2-pyrrolidinone is prepared from 4-(2-hydroxyethyl)-3,3-diphenyl-1-allyl-2-pyrrolidinone, beta-bromopropionyl chloride, and dimethylamine.

EXAMPLE 17

In the same manner as given in Example 1 4-[2-gamma-ethylaminobutyroyloxy)-ethyl]-3,3-dimethyl-1-ethyl-2-pyrrolidinone is prepared from 4-(2-hydroxyethyl)-3,3-dimethyl-1-ethyl-2-pyrrolidinone, gamma-bromobutyryl chloride, and ethylamine.

EXAMPLE 18

In the same manner as given in Example 1, 4-[2-beta-methylethylaminobutyryloxy)-ethyl]-3-phenyl-3-(p-methoxyphenyl)-1-isopropyl-2-pyrrolidinone is prepared from 4-(2-hydroxyethyl)-3-phenyl-3-(p-methoxyphenyl)-1-isopropyl-2-pyrrolidinone, beta-iodobutyryl chloride, and ethylmethylamine.

EXAMPLE 19

In the same manner as given in Example 1, 4-[3-(alpha-methyl-beta-diethylaminopropionoxy)-propyl]-5-methyl-3,3-diphenyl-1-isopropyl-2-pyrrolidinone is prepared from 4-(3-hydroxypropyl)-5-methyl-3,3-diphenyl-1-isopropyl-2-pyrrolidinone, alpha-methyl-beta-chloropropionyl chloride, and dimethylamine.

EXAMPLE 20

In the same manner as given in Example 1, 4-[3-(delta-piperidinovaleryloxy)-propyl]-5-methyl-3,3-diphenyl-1-isopropyl-2-thionpyrrolidinone is prepared from 4-(3-hydroxypropyl)-5-methyl-3,3-diphenyl-1-isopropyl-2-thionpyrrolidinone, delta-chlorovaleryl chloride, and piperidine.

EXAMPLE 21

In the same manner as given in Example 1,

4-{3-[α-methyl-beta-(2-methylpiperidino)-butyryloxy]-2-propyl}-3,3-diphenyl-1-ethyl-2-pyrrolidinone is prepared from 4-(3-hydroxy-2-propyl)-3,3-diphenyl-1-ethyl-2-pyrrolidinone,
alpha-methyl-beta-bromobutyryl bromide, and
2-methylpiperidine.

EXAMPLE 22

In the same manner as given in Example 1,

4-{2-[gamma-(2,4-dimethylpiperidino)-valeryloxy]ethyl}-3-phenyl-3-(3-pyridyl)-1-benzyl-2-pyrrozilidone is prepared from 4-(2-hydroxyethyl)-3-phenyl-3-(3-pyridyl)-1-benzyl-2-pyrrolidinone,
gamma-chlorovaleryl chloride, and
2,4-dimethylpiperidine.

EXAMPLE 23

In the same manner as given in Example 1,

4-{4-[α-(4-methylpiperazino)valeryloxy]-2-butyl}-3,3-diphenyl-1-isopropyl-2-pyrrolidinone is prepared from 4-(4-hydroxy-2-butyl)-3,3-diphenyl-1-isopropyl-2-pyrrolidinone,
alpha-chlorovaleryl chloride, and
4-methylpiperazine.

EXAMPLE 24

In the same manner as given in Example 1,

4-{2-methyl-3-[alpha-methyl-gamma-(3-methylpyrrolidino)-valeryloxy]-propyl}-3,3-diphenyl-1-isopropyl-2-pyrrolidinone is prepared from 4-(2-methyl-3-hydroxypropyl)-3,3-diphenyl-1-isopropyl-2-pyrrolidinone,
alpha-methyl-gamma-bromovaleryl chloride, and
3-methylpyrrolidine.

The products of Examples 1 through 24 show analeptic activity and some demonstrate hypotensive activity.

In the same manner,

4-[2-(α-dimethylaminoacetoxy)-ethyl]-1,3-dimethyl-3-phenyl-2-pyrrolidinone,
4-[2-(β-diisopropylaminopropionoxy)-ethyl]-1-benzyl-3,3-diphenyl-2-pyrrolidinone,
4-[3-(α-hexamethyleneiminoacetoxy)-propyl]-1-cyclohexyl-3-(2- or 3-thienyl)-3-phenyl-2-pyrrolidinone,
4-[2-(α-dimethylaminoacetoxy)-propyl]-1-isopropyl-3-cyclohexyl-3-phenyl-2-pyrrolidinone,
4-[2-(α-dimethylaminoacetoxy)-ethyl]-1-isopropyl-3-(3-pyridyl)-2-pyrrolidinone,
4-[2-(α-dimethylaminoacetoxy)-ethyl]-1,3-diisopropyl-3-phenyl-2-pyrrolidinone,
4-[2-(α-dimethyl-aminoacetoxy)-ethyl]-1-isopropyl-3-(p-methoxyphenyl)-3-phenyl-2-pyrrolidinone,
4-[2-(α-dimethylaminoacetoxy)-ethyl]-1-isopropyl-3-(m-chlorophenyl)-3-phenyl-2-pyrrolidinone,
4-[2-(α-dimethylaminoacetoxy)-ethyl]-1-isopropyl-3-(m-chlorophenyl)-3-phenyl-2-pyrrolidinone,
4-[2-(α-dimethylaminoacetoxy)-ethyl]-1-isopropyl-3-(o-methylphenyl)-3-phenyl-2-pyrrolidinone, and
4-[1-methyl-2-(α-dimethylaminoacetoxy)-ethyl]-1-isopropyl-3-phenyl-3-(2- or 3-thienyl)-2-pyrrolidinone are prepared from 4-(2-hydroxyethyl)-1,3-dimethyl-3-phenyl-2-pyrrolidinone,
4-(2-hydroxyethyl)-1-benzyl-3,3-diphenyl-2-pyrrolidinone,
4-(3-hydroxypropyl)-1-cyclohexyl-3-(2- or 3-thienyl)-3-phenyl-2-pyrrolidinone,
4-(2-hydroxypropyl)-1-isopropyl-3-cyclohexyl-3-phenyl-2-pyrrolidinone,
4-(2-hydroxyethyl)-1-isopropyl-3-(3-pyridyl)-2-pyrrolidinone,
4-(2-hydroxyethyl)-1,3-diisopropyl-3-phenyl-2-pyrrolidinone,
4-(2-hydroxyethyl)-1-isopropyl-3-(p-methoxyphenyl)-3-phenyl-2-pyrrolidinone,
4-(2-hydroxyethyl)-1-isopropyl-3-(m-chlorophenyl)3-phenyl-2-pyrrolidinone,
4-(2-hydroxyethyl)-1-isopropyl-3-(m-chlorophenyl)-3-phenyl-2-pyrrolidinone,
4-(2-hydroxyethyl)-1-isopropyl-3-(o-methylphenyl)-3-phenyl-2-pyrrolidinone, and
4-(1-methyl-2-hydroxyethyl)-1-isopropyl-3-phenyl-3-(2- or 3-thienyl)-2-pyrrolidinone, respectively, and the appropriate haloacylhalides and amines, in accord with the preceding examples. The corresponding 4-amino acyloxyalkyl-2-thionpyrrolidinones are prepared by employing the corresponding 2-thionpyrrolidinone-4-hydroxyalkyl compound in place of the starting 2-pyrrolidinone-4-hydroxyalkyl compound. In this manner, the compounds of the foregoing Formula I are prepared, as well as their acid addition salts.

The compounds prepared in the foregoing examples exhibit analeptic activity. Some compounds demonstrate sufficient hypotensive activity to merit their use as hypotensives.

*Formulation and administration.*—Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition salts for purposes of convenience of crystallization, increased solubility, and the like. The amino-lower-aliphatic acid esters of 1-alkyl-3,3-disubstituted-4-hydroxyalkyl-2-pyrrolidinones and 2-thionpyrrolidinones, especially in the form of their acid-addition salts, represent a preferred group of highly active compounds, of which the 1-isopropyl compounds are outstandingly active. Preferred groups at the 3-position are phenyl radicals as the 3,3-diphenyl compounds are likewise outstanding in their activity.

Although very small quantities of the active materials of the present invention are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result, e.g., analeptic or hypotensive, desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The formulations of Example 25 are representative for all of the pharmacologically active compounds of the invention, but have been especially designed to embody as active ingredient amino-lower-aliphatic acid esters of 1-alkyl-3,3-diphenylhydroxyalkyl-2-pyrrolidinones and 2-thionpyrrolidinones, especially the diloweralkylamino or heterocyclic amino-lower-aliphatic acid esters of the foregoing examples, or their hydrochlorides, hydrobromides, methiodides, or like pharmaceutically acceptable salts.

EXAMPLE 25.—FORMULATIONS

(1) *Capsules*

Capsules of 5 mg., 25 mg., and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total, mg | 435.0 | 435.0 | 550.0 |

In each case, uniformly blend the selected active ingredient with lactose, starch, and magnesium stearate and encapsulate the blend.

(2) *Tablets*

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows.

(A) 50 MG. TABLET

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

(B) 100 MG. TABLET

| Ingredients: | Per tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheight overnight. The dried granules are passed through a number ten mesh screen. These dried granules are blended with the proper weight of calcium stearate and the lubricated granules are then converted into tablets on a suitable tablet press.

(C) 250 MG. TABLET

| Ingredients: | Per tablet, mg. |
|---|---|
| Active ingredient, as salt | 250.0 |
| Corn starch | 56.0 |
| Carbowax 6000 (polyethylene glycol of M.W. approximately 6000) | 25.0 |
| Lactose | 35.0 |
| Magnesium stearate | 4.0 |
| Total | 370.0 |

Uniformly blend the active ingredient, corn starch, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

(D) 500 MG. TABLET

| Ingredients: | Per tablet, mg. |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighted amounts of corn starch and calcium stearate are uniformly blended and these lubricated granules are compressed on a suitable tablet press.

(3) *Injectable-2% sterile solution*

| | Per cc. |
|---|---|
| Active ingredient | 20 mg. |
| Preservative, e.g., chlorobutanol | 0.5% weight/volume. |
| Water for injection | Q.s. |

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

We claim:
1. A compound selected from the group consisting of heterocyclic esters having the formula:

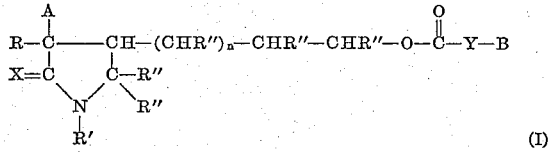

wherein
A is monocarbocyclic aryl having six ring carbon atoms,
X is selected from the group consisting of oxygen and sulfur,
R is selected from the group consisting of monocarbocyclic aryl having six ring carbon atoms, monocarbocyclic aralkyl having six ring carbon atoms, lower-alkyl, cycloalkyl having up to a maximum of nine carbon atoms, pyridyl, thienyl, and thenyl,
R' is selected from the group consisting of lower-alkyl, lower-alkenyl, cycloalkyl having up to a maximum of nine carbon atoms, cycloalkenyl having up to a maximum of nine carbon atoms, and monocarbocyclic aralkyl having six ring carbon atoms,
R" is selected from the group consisting of hydrogen and methyl, a maximum of two R" being other than hydrogen,
wherein monocarbocyclic aryl and monocarbocyclic aralkyl have at most fifteen carbon atoms and wherein the aryl group in each such monocarbocyclic radical is substituted by a member selected from the group consisting of hydrogen, nitro, lower-alkoxy, lower-alkylmercapto, lower-alkyl, dilower-alkylamino, trifluoromethyl, and halogen, and wherein "alkyl" in "aralkyl" is lower-alkyl,
$n$ is selected from zero and one,
Y is a lower-alkylene radical having a maximum of six carbon atoms,
B is an amino radical selected from the group consisting of lower-alkyl-amino; di-lower-alkyl-amino; lower-alkenyl-amino; di-lower-alkenyl-amino; phenylamino; (hydroxy-loweralkyl)-amino; di-(hydroxy-lower-alkyl)-amino; lower-alkyl-(hydroxy-lower-alkyl)-amino; basic saturated monocyclic heterocyclic radicals of less than twelve carbon atoms selected from the group consisting of piperidino, lower-alkyl-piperidino; di-lower-alkyl-piperidino; lower-alkoxy-piperidino; pyrrolidino; lower-alkyl-pyrrolidino; di-lower-alkyl-pyrrolidino; lower-alkoxy-pyrrolidino; morpholino; lower-alkyl-morpholino; di-lower-alkyl-morpholino; lower-alkoxy-morpholino; thiomorpholino; lower-alkyl-thiomorpholino; di-lower-alkyl-thiomorpholino; lower-alkoxy-thiomorpholino; piperazino; lower-alkyl-piperazino; di-C-(lower-alkyl)-piperazino; $N^4$-(lower-alkyl)-C-(lower-alkyl)-piperazino; N-(hydroxy-lower-alkyl)-piperazino; N-(lower-alkanoyloxy lower-alkyl)-piperazino; lower-alkoxy-piperazino; N'-lower-alkoxy-lower-alkylpiperazino; and lower-carbalkoxy-piperazino;
and acid-addition salts thereof.

2. A 4-di-lower-alkylamino-lower-alkanoyloxy)-ethyl-1-lower-alkyl-3,3-diphenyl-2-pyrrolidinone, wherein the lower-alkanoyloxy group has a maximum of six carbon atoms inclusive.

3. A 4-(amino-lower-alkanoyloxy)-ethyl-1-lower-alkyl-3,3-diphenyl-2-pyrrolidinone wherein the amino group is a saturated monocyclic heterocyclic radical of less than twelve carbon atoms having up to a maximum of two hetero atoms in the heterocyclic ring and the lower-alkanoyloxy group has a maximum of six carbon atoms inclusive.

4. A non-toxic acid addition salt of a 4-(di-lower-alkyl-amino-lower-alkanoyloxy)-ethyl-1-lower-alkyl-3,3-diphenyl-2-pyrrolidinone, wherein the lower-alkanoyloxy group has a maximum of six carbon atoms inclusive.

5. A non-toxic acid addition salt of a 4-(di-lower-alkyl-amino-lower-alkanoyloxy)-ethyl-1-lower-alkyl-3,3-diphenyl-2-pyrrolidinonethion, wherein the lower-alkanoyloxy group has a maximum of six carbon atoms inclusive.

6. A non-toxic acid addition salt of a 4-(amino-lower-alkanoyloxy)-ethyl-1-lower-alkyl-3,3-diphenyl-2-pyrrolidinone according to claim 3 wherein the amino group is a saturated monocyclic heterocyclic radical of less than twelve carbon atoms having up to a maximum of two hetero atoms in the heterocyclic ring and the lower-alkanoyloxy group has a maximum of six carbon atoms inclusive.

7. 4-[2-(α-diethylaminoacetoxy) - ethyl] - 1- -isopropyl-3,3-diphenyl-2-pyrrolidinone.

8. A 4-{2-[α-(4-methylpiperazino)-acetoxy]-ethyl}-1-isopropyl-3,3-diphenyl-2-pyrrolidinone non-toxic acid addition salt.

9. A 4-[2-(α-morpholinoacetoxy)-ethyl]-1-isopropyl-3,3-diphenyl-2-pyrrolidinone non-toxic acid addition salt.

10. 4-[2-(α - pyrrolidinoacetoxy)-ethyl]-1-isopropyl-3,3-diphenyl-2-pyrrolidinone.

11. 4-[2-(α - piperidinoacetoxy)-ethyl] - 1- -isopropyl-3,3-diphenyl-2-pyrrolidinone.

12. 4-[2-(α - hexamethyleneiminoacetoxy)-ethyl]-1-isopropyl-3,3-diphenyl-2-pyrrolidinone.

13. 4-[2-(α - di - lower-alkylaminoacetoxy)-ethyl]-1-lower-alkyl-3,3-diphenyl-2-pyrrolidinone.

References Cited by the Examiner

UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,425,320 | 8/47 | Hill | 252—149 |
| 2,884,426 | 4/59 | Kottler et al. | 260—326.3 |
| 2,885,404 | 5/59 | Petrow et al. | 260—294.3 |
| 2,891,071 | 6/59 | Aspergren et al. | 260—326.3 |
| 2,892,753 | 6/59 | Schmidt et al. | 167—65 |
| 2,997,422 | 8/61 | Tedeschi | 167—65 |

IRVING MARCUS, *Primary Examiner.*

NICHOLAS S. RIZZO, WALTER A. MODANCE, *Examiners.*

UNITED STATES PATENT OFFICE
CERTIFICATE OF CORRECTION

Patent No. 3,192,209

June 29, 1965

Carl D. Lunsford et al.

It is hereby certified that error appears in the above numbered patent requiring correction and that the said Letters Patent should read as corrected below.

Column 1, line 42, for "methy" read -- methyl --; column 5, line 45, for "-aminoproponic", each occurrence, read -- -aminopropionic --; column 6, line 59, for "deta-" read -- beta- --; column 7, line 6, for "thiomropholine" read -- thiomorpholine --; column 9, line 45, for "priopionyl" read -- propionyl --; line 75, for "washen" read -- washed --; column 13, line 26, for "nad" read -- and --; column 18, line 3, for "-3,2-" read -- -3,3- --; same column 18, lines 8 and 9, strike out "and 4-(2-chloroethyl)3,3-diphenyl-1-ethyl-2-thionpyrrolinone,"; column 20, line 5, for "MORPHOLINOACETOXY" read -- MORPHOLINOACETOXY) --; line 46, for "Example 7" read -- Example 1 --; line 51, for "[2-ALPHA-" read -- [2-(ALPHA- --; column 21, line 21, for "Example 1 4-" read -- Example 1, 4- --; line 27, for "[2-beta-" read -- [2-(beta- --; line 41, for "dimethylamine" read -- diethylamine --; line 64, for "pyrrozilidone" read -- pyrrolidinone --; column 25, line 39, for "weighted" read -- weighed --.

Signed and sealed this 26th day of April 1966.

(SEAL)
Attest:

ERNEST W. SWIDER
Attesting Officer

EDWARD J. BRENNER
Commissioner of Patents